No. 618,110. Patented Jan. 24, 1899.
J. C. LUNDY.
DISK ATTACHMENT FOR DRILLS.
(Application filed Mar. 19, 1898.)
(No Model.) 2 Sheets—Sheet 1.
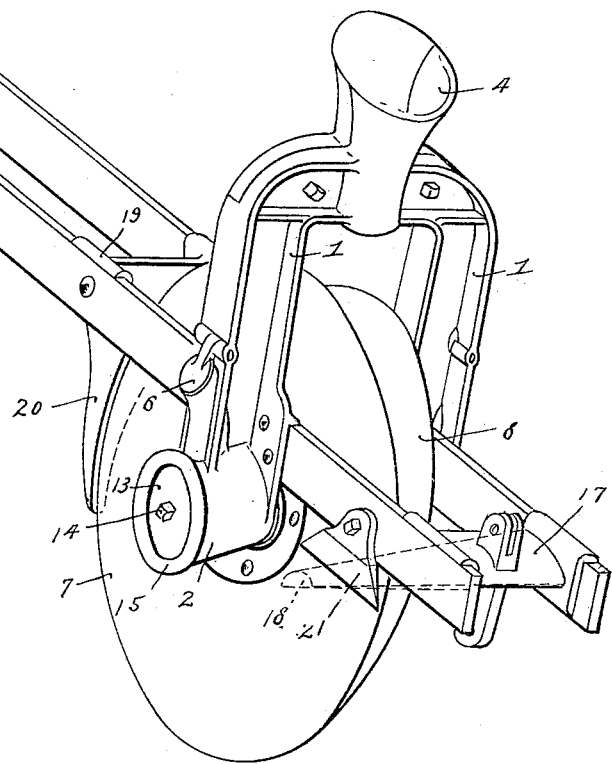
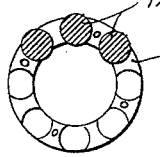
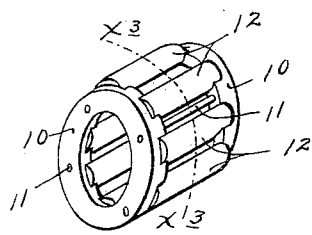
Witnesses. Inventor.
Harry Kilgore John C Lundy
E. D. Merchant By his attorney,
Jas F Williamson
THE NORRIS PETERS CO., PHOTO-LITHO., WASHINGTON, D. C.

No. 618,110. Patented Jan. 24, 1899.
J. C. LUNDY.
DISK ATTACHMENT FOR DRILLS.
(Application filed Mar. 19, 1898.)

(No Model.) 2 Sheets—Sheet 2.

Witnesses.
Harry Kilgore
R. D. Merchant

Inventor.
John C. Lundy
By his attorney
Jas. F. Williamson

UNITED STATES PATENT OFFICE.

JOHN C. LUNDY, OF WILSONVILLE, CANADA, ASSIGNOR TO THE MONITOR MANUFACTURING COMPANY, OF MINNEAPOLIS, MINNESOTA.

DISK ATTACHMENT FOR DRILLS.

SPECIFICATION forming part of Letters Patent No. 618,110, dated January 24, 1899.

Application filed March 19, 1898. Serial No. 674,426. (No model.)

*To all whom it may concern:*

Be it known that I, JOHN C. LUNDY, a subject of the Queen of Great Britain, residing at Wilsonville, in the Province of Ontario, Canada, have invented certain new and useful Improvements in Disk Attachments for Drills; and I do hereby declare the following to be a full, clear, and exact description of the invention, such as will enable others skilled in the art to which it appertains to make and use the same.

My invention relates to disk drills, and has for its object to provide an improved disk attachment for the same.

To the end above indicated my invention consists of the novel devices and combinations of devices hereinafter described, and defined in the claims.

The preferred form of my improved attachment is illustrated in the accompanying drawings, wherein like characters indicate like parts throughout the several views.

Figure 4:
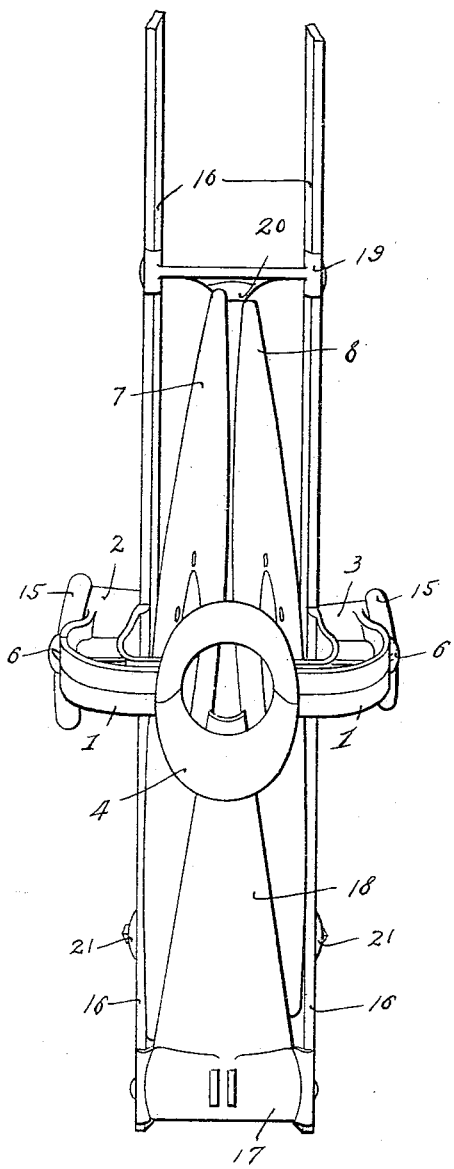
Figure 5:
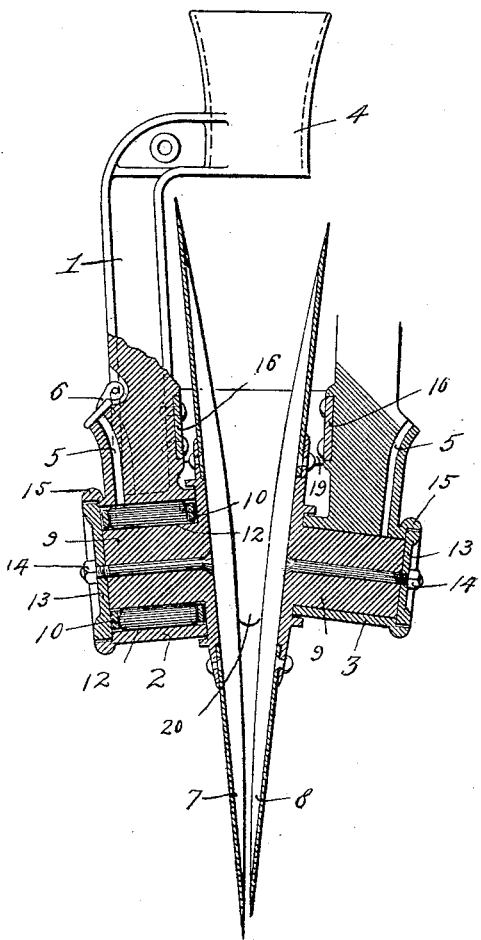

Figure 1 is a perspective view of the attachment, some parts being broken away. Fig. 2 is a perspective view of one of the roller-bearing devices removed from working positions. Fig. 3 is a transverse section taken on the line $x^3 x^3$ of Fig. 2, some parts being broken away. Fig. 4 is a plan view of the attachment shown in Fig. 1; and Fig. 5 is a view, partly in rear elevation and partly in vertical section, taken transversely through the centers of the disks.

1 indicates an approximately U-shaped casting or yoke, the depending prongs of which terminate in cylindrical journal-boxes 2 and 3. At its upper and central portion the casting 1 is provided with a funnel-shaped neck or section 4, through which the seeds are discharged in the ordinary manner and by the ordinary means. As shown, oil-ducts 5 lead to the boxes 1 and 2. Hinged covers 6 may be used to close the ducts 5, if desired. The axes of the boxes 2 and 3 are inclined upward and rearward as they approach each other, so as to set the furrow-forming disks at the proper angle to each other, as will be hereinafter particularly described.

7 and 8 indicate the furrow-forming disks, of which the disk 7 is the larger of the two. These disks are provided with strong and heavy trunnions 9, that are turned outward from the disks and extend in opposite directions. The trunnion 9 of the disk 8 works directly in the journal-box 3; but the trunnion 9 of the disk 7 works directly on a roller-bearing device, which in turn works directly in the journal-box 2. This roller-bearing device, as shown, comprises a pair of laterally-spaced rings 10, held apart by spacing-rods 11, and a series of rollers 12, loosely mounted in the said rings. The trunnions 9 are held against endwise movement in their seats by means of disk-like caps or washers 13, that are rigidly secured to said trunnions by means of nutted bolts 14, and are provided with projecting peripheries that engage seats or countersunk ledges 15 in the outer ends of the coöperating journal-boxes 3 or 4, as the case may be. The disks 7 and 8 are thus set so that they spread or flare to the greatest extent in a direction upward and slightly rearward, or, in other words, are set so that they run closest at a point slightly forward of their lower portions. As previously stated, these disks are given only sufficient flare to open up a furrow wide enough to permit the seed to be properly planted. It is further important to note that in this improved construction the disks of themselves serve as guides to direct the seeds to the bottom of the furrow.

The attachment is drawn from the machine in the ordinary way, and for this purpose a pair of parallel bars 16 are riveted or otherwise rigidly secured to the prongs of the bracket or casting 1. The rear ends of these bars 16 are spaced apart and rigidly secured together by a block or bracket 17, which is provided with a double-faced scraper 18, that works on the inner surfaces of the two disks 7 and 8. Just forward of the disks the bars 16 are tied and rigidly secured together by the spacing-bracket 19, that is provided with a depending guard 20. This guard 20 extends below the centers of the disks and prevents rubbish from getting between the disks. 21 indicates scrapers secured to the rear ends of the bars 16 and working over the outer surfaces of the disks 7 and 8.

It is of course obvious that the roller-bearing or antifriction device might be employed in both of the journals instead of one. There is, however, a greater necessity for the roller-bearing in connection with the disk 7, for this disk, being the larger of the two, makes the initial cut or depression in the ground, and hence is subjected to the greatest strains.

While it would not in any sense be the full equivalent of the construction above shown, it would be within the broad scope of my invention to use, for example, the single disk 7 with its bearings arranged as shown. In other words, it would be within the scope of my invention to use a single disk with its bearing extended from its side which is turned from the furrow, for by this construction the side of the disk which is turned toward the furrow is left free or clear of obstructions which might interfere with the dropping or delivery of the grain into the furrow.

It will of course also be understood that various other alterations in the details of construction may be made without departing from the spirit of my invention. For example, ball-bearing devices might be employed in lieu of the roller-bearing devices. Hence the term "antifriction-bearing device" is herein used in the specification to designate either a roller or a ball bearing device.

What I claim, and desire to secure by Letters Patent of the United States, is as follows:

1. A disk attachment for drills, involving an approximately U-shaped frame or bracket provided at its upper transverse portion with a neck or tubular seed-passage, and a pair of disks journaled to and working between the prongs of said bracket, substantially as described.

2. A disk attachment for drills, involving an approximately U-shaped frame or bracket provided with journal-boxes, and a pair of disks set at an angle to each other and provided with outturned trunnions that are journaled in said journal-boxes, substantially as and for the purposes set forth.

In testimony whereof I affix my signature in presence of two witnesses.

JOHN C. LUNDY.

Witnesses:
BESSIE B. NELSON,
F. D. MERCHANT.